United States Patent [19]

Catanescu et al.

[11] Patent Number: 5,631,428
[45] Date of Patent: May 20, 1997

[54] CAPACITIVE SEMICONDUCTOR PRESSURE SENSOR

[75] Inventors: Ralf Catanescu, Bremen; Thomas Scheiter; Christofer Hierold, both of Munich, all of Germany

[73] Assignee: Siemens Aktiengesellschaft, Munich, Germany

[21] Appl. No.: 561,854

[22] Filed: Nov. 22, 1995

[30] Foreign Application Priority Data

Nov. 24, 1994 [DE] Germany .......................... 44 41 908.2

[51] Int. Cl.⁶ ................................................. G01L 9/12
[52] U.S. Cl. ........................ 73/724; 73/718; 361/283.4; 257/419
[58] Field of Search ................ 73/724, 718; 257/419; 361/283.4

[56] References Cited

U.S. PATENT DOCUMENTS 4,332,000  5/1982  Petersen .
4,665,610  5/1987  Barth .
5,095,401  3/1992  Zavracky .

FOREIGN PATENT DOCUMENTS

| 0 618 435 A2 | 3/1994 | European Pat. Off. . |
| 34 45 774 A1 | 4/1985 | Germany . |
| 37 23 561 A1 | 1/1988 | Germany . |
| 44 10 631 A1 | 10/1994 | Germany . |

Primary Examiner—Richard Chilcot
Assistant Examiner—Joseph L. Felber
Attorney, Agent, or Firm—Hill, Steadman & Simpson

[57] ABSTRACT

A micromechanically manufacturable pressure sensor has a cavity produced in an auxiliary layer that is covered with a membrane layer, the cavity is produced via recesses in the membrane layer. These recesses are subsequently closed by portions of a closure layer. Further layers can be applied on the closure layer. Portions of the further layers and closure layer are removed above the membrane layer.

9 Claims, 1 Drawing Sheet

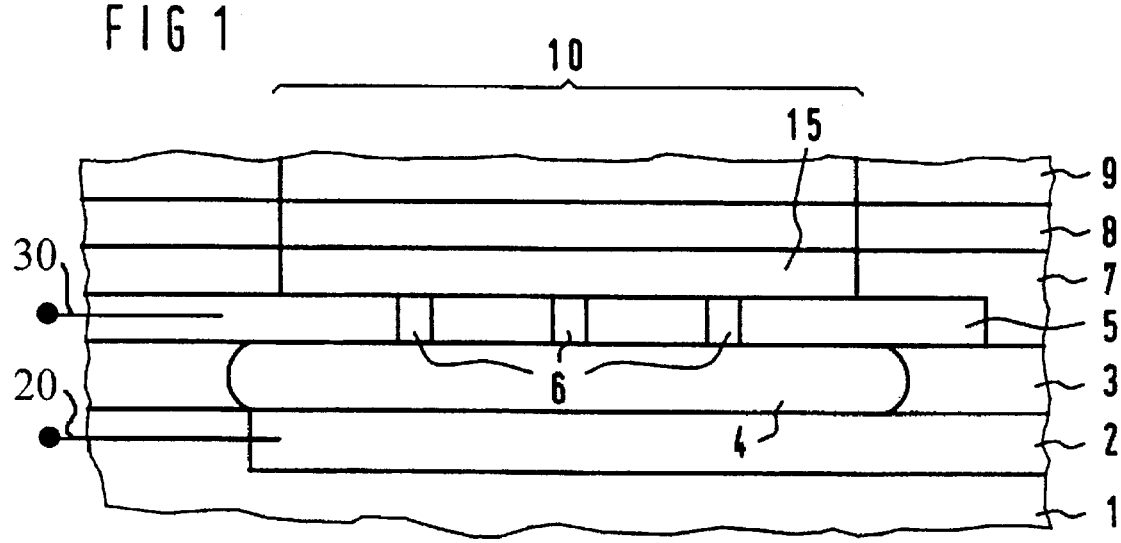
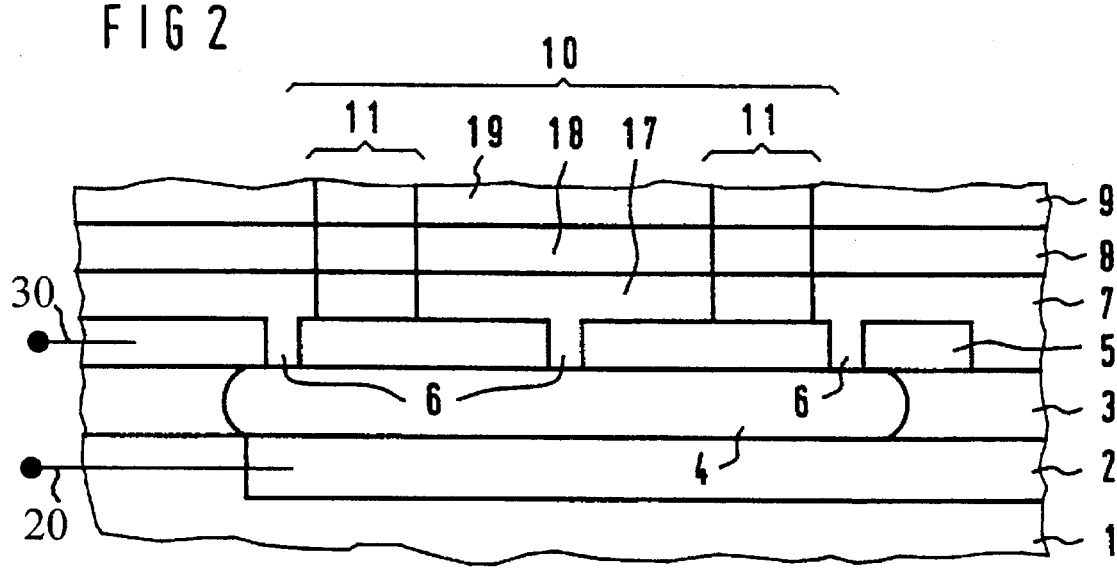

CAPACITIVE SEMICONDUCTOR PRESSURE SENSOR

BACKGROUND OF THE INVENTION

The present invention is directed to a micromechanically manufacturable capacitive pressure sensor.

Capacitive pressure sensors are employed for measuring absolute pressure. A closed chamber with a reference pressure is closed off by an elastic membrane that is exposed to an external pressure. Together with the opposite side of this chamber, the electrically conductive membrane forms a plate capacitor. The membrane is deformed due to the pressure difference between the external pressure and the internal reference pressure. The capacitance of this capacitor changes due to the altered distance between the membrane and the back side of the chamber acting as a cooperating electrode. The external pressure can be determined from this change in capacitance.

U.S. Pat. No. 5,095,401 incorporated herein by Paul M. Zavracky et al. discloses pressure sensors on a SOI substrate wherein a cavity is produced such that a region of silicon oxide produced with a LOCOS technique is removed through small openings in a layer applied thereon. These openings are subsequently closed by oxidation of the adjoining silicon, or by applying a further layer of silicon nitride, polysilicon or the like. This Letters Patent also discloses the employment of the manufacturing method disclosed therein for the manufacture of capacitive measuring pressure sensors. A crystallized silicon layer is a component part of the membrane of this pressure sensor, this crystallized silicon layer being employed outside of the pressure sensor for the integration of electronic components and being employed in the region of the membrane for designing piezo resistors.

SUMMARY OF THE INVENTION

An object of the present invention is to specify an improved micromechanical pressure sensor and an applicable manufacturing process that can be unproblematically integrated into a BiCMOS process.

This object is achieved with the pressure sensor. In the semiconductor component pressure sensor of the invention, a cavity is provided which is limited on one side by a membrane substantially formed by an electrically conductive membrane layer. Recesses are provided in the membrane layer. A closure layer is applied onto the membrane layer, a material of said closure layer being provided in said recesses. An electrically conductive region is provided at a side of the cavity facing away from the membrane layer. The membrane layer is deformable such that, given a change within a predetermined interval of a pressure present at a side of the membrane layer facing away from the cavity, a change of electrical capacitance occurs, said capacitance being defined by said membrane layer and said conductive region. This capacitance change can then be measured via electrical terminals. Contacts for the electrical terminals of the membrane layer and the conductive region are provided.

According to a method of the invention for manufacture of a semiconductor component pressure sensor, an electrically conductively doped region is produced at an upper side of the substrate of semiconductor material. A layer is provided for manufacture of a cavity, said layer being provided over the electrically conductively doped region. A membrane layer is then applied on the layer provided for the manufacture of the cavity. Recesses are produced with a mask in the membrane layer in a region over the cavity to be produced. The cavity is then etched out of the layer provided for the manufacture of the cavity between the membrane layer and the doped region by use of the recesses. The closure layer is then applied onto the membrane layer such that the recesses are closed, but without filling the cavity. Structures for applying an electrical voltage to the membrane layer and to the doped region are then provided. The membrane may also be finished so that it has an intended deformability.

The pressure sensor of the present invention is a capacitive measuring pressure sensor, whereby the membrane is electrically conductively designed. Conductively doped polysilicon, for example, as applied in the framework of the manufacturing process of integrated circuits for the gate electrode of field effect transistors or a metal that, for example, is applied together with a metallization level provided for electronic circuits, come into consideration as material for the membrane. During manufacture, this membrane is provided with a plurality of etching openings through which material located under the membrane is removed by etching. No additional layers or mask steps are therefore required, compared to a standard CMOS process execution. These etching openings are closed by constituent parts of a subsequently applied planarization layer composed of a dielectric. The membrane can be stiffened by use of subsequently applied layers, or its oscillatable mass can be enlarged.

BRIEF DESCRIPTION OF THE DRAWINGS

FIG. 1 shows a typical design of the pressure sensor in cross-section; and

FIG. 2 shows an alternative design with a die-like or stamp-like cap on the upper side of the membrane.

DETAILED DESCRIPTION OF THE PREFERRED EMBODIMENTS

In the pressure sensor, a conductive region 2 is formed in a substrate 1 (see FIG. 1) of, for example, silicon, for example by doping of the semiconductor material or by applying a separate layer. A further layer is situated thereover, this being provided for the manufacture of the cavity required for the pressure sensor. This layer can either be separately applied as what is referred to as a sacrificial layer, or can be formed by an upper layer portion of the substrate. This layer or this layer-like upper portion is referred to below and in the claims as an auxiliary layer 3. The auxiliary layer is preferably designed with a LOCOS technique as an oxide layer produced from the silicon of the substrate by thermal oxidation.

A membrane layer 5 is applied over the auxiliary layer. This membrane layer 5 is, for example, polysilicon and is advantageously produced during manufacture together with the gate electrodes of MOSFETs. In case an electrically conductive portion of this membrane layer 5 is applied on the auxiliary layer 3, the auxiliary layer 3 is provided as an electrically insulating layer so that the membrane layer 5 and the conductive region 2 are electrically insulated from one another. The auxiliary layer 3 is already an electrical insulator in the preferred embodiment. Recesses 6 that serve during manufacture as openings for etching out the cavity provided in the region of the layer under the membrane layer 5 are located in this membrane layer 5. In order to enable a reference pressure to build up in the cavity 4, the recesses in the membrane layer 5 are closed with, for example, a dielectric that is part of an applied closure layer 7. This closure layer 7 can, for example, be a layer of dielectric applied in surface-wide fashion as a planarization layer.

Further layers 8, 9 can be additionally applied in conformity with the overall process. The closure layer 7 and these further layers 8, 9 are removed in the region 10 overlying a portion of the membrane 5 in the exemplary embodiment shown in FIG. 1; however, a stiffening layer 15 can be applied in surface-wide fashion on the membrane for reinforcing and stiffening the membrane. This stiffening layer 15 is shown in FIG. 1 at the same level as the closure layer 7. Hatchings indicating a section have been omitted from the drawing for the sake of clarity. Given the presence of the stiffening layer 15, only the region indicating the cavity 4 and the regions of the layers 8 and 9 located over the membrane 10 are plan views onto the back, lateral surfaces of the corresponding layers. Given a lack of the stiffening layer 15, this region, correspondingly, is also a plan view onto the back lateral surface of the layer 7. All other regions in the drawing are sections. The stiffening layer 15 can, for example, be formed of metal that is part of a metallization plane that had been applied for an electronic circuit likewise produced on the substrate. Given identical dimensions, the measuring range is expanded toward higher pressures by the stiffening of the membrane. The removal of the layer portions of the closure layer 7 and of the further layers 8, 9 that are not required occurs during manufacture by etching over such a limited time interval that the closures of the recesses 6 in the membrane layer 5 are not in turn removed.

A contact 30 is provided to the membrane layer 5 and a contact 20 is provided to the conductive region 2 as shown in FIGS. 1 and 2. Equipment for detecting a change of capacitance then is connected to terminals 20 and 30.

The membrane layer 5 can be a metal or a layer sequence of a plurality of metal layers. In this embodiment, the membrane layer is preferably applied as part of one or more metallization planes that are provided for electronic circuits. Layers (for example, BPSG, borophosphorous silicate glass) applied before the metal within the framework of the overall process for the planarization of components can then likewise be applied in the region of the pressure sensor for enlarging the auxiliary layer 3. The LOCOS layer can then be correspondingly produced thinner.

It is especially expedient when the first metallization plane (wiring plane) is employed for the membrane layer because the insulation layer that is to be applied anyway between the first and the second metallization plane can then be employed as closure layer. Here, too, the further layers applied over the membrane are removed by temporally limited etching without damaging the membrane layer 5 and the closures of the recesses.

The plurality and arrangement of the recesses in the membrane layer in the pressure sensor of the invention can be selected such that the etch-out of the cavity to be produced thereunder is time-compatible with the process steps of the overall process. By contrast to methods wherein the cavity is etched proceeding from the membrane edges, the pressure sensor of the invention can be manufactured without having to produce additional, structured oxide layers and without excessively long etching times being required.

In the exemplary embodiment of FIG. 2, portions 17, 18, 19 of the closure layer 7 and of the further layers 8, 9 are left on the membrane. In order to permit the mobility of the membrane, these portions 17, 18, 19 are separated from the rest of the layers by an opening 11. A type of die-like cap is formed in this way on the middle part of the membrane 10. The opening extends down to the membrane layer 5 and can, for example, be annular in the plan view. Given a rectangular membrane, this opening 11, however, can also be rectangularly bounded, for example, in the plan view. The recesses 6 are preferably not present in the region of this opening 11. During manufacture, this membrane layer then acts as an etch-stop layer when etching out the opening 11. A respective recess 6 is shown in FIG. 2 at the edges of the membrane and in the inner region under the separated portion 17 of the closure layer 7. However, an arbitrary plurality of recesses 6 can also be fundamentally present. The plurality and size are respectively determined by the size of the cavity 4 to be produced and by the other dimensions. When the regions of the openings 11 comprise no recesses 6, the etching of the cavity 4 lasts longer in these regions. So that this longer etching time does not become problematical for further components integrated with the pressure sensor, the size of the area of the membrane layer 5 uncovered with the opening 11 is to be potentially dimensioned adequately small. It can suffice for an adequate mobility of the membrane when, for example, an annular opening 11 is produced so narrow that recesses for the etching process can be arranged adequately close to one another.

The portions 17, 18, 19 separated all around from the remaining portions of the layers stiffen the membrane, so that the measuring range is expanded toward higher pressures given the same dimensions. Furthermore, the inert mass of the membrane is increased, so that a potential noise in the measured signal as a consequence of extremely brief-duration pressure fluctuations can be suppressed. In this embodiment of FIG. 2, too, the membrane layer 5 can, for example, be polysilicon or a potentially multi-layer metal layer. The embodiment of FIG. 2 differs from that of FIG. 1 by the arrangement of the recesses 6, of the closure layer 7 remaining over the recesses 6 closed therewith, and by the die-like structure of layer portions on that side of the membrane layer 5 facing away from the cavity 4 that are separated from the rest of the layers by the opening 11.

Although various minor changes and modifications might be proposed by those skilled in the art, it will be understood that our wish is to include within the claims of the patent warranted hereon all such changes and modifications as reasonably come within our contribution to the art.

We claim as our invention:

1. A semiconductor component pressure sensor, comprising:

an electrically conductive region;

a layer over the electrically conductive region defining a cavity;

an electrically conductive membrane layer overlying the cavity;

recesses in the membrane layer above the cavity;

a closure layer applied on the membrane layer;

said membrane layer being deformable so that given a change of pressure within a predetermined interval at a side of the membrane layer facing away from the cavity, the membrane layer can deflect so as to cause a change of electrical capacitance defined by the conductive region and the electrically conductive membrane layer;

electrical contacts respectively connected to the membrane layer and conductive region for measuring said change of electrical capacitance; and a material of the closure layer being introduced into said recesses.

2. A semiconductor component pressure sensor, comprising:

an electrically conductive region;

a layer over the electrically conductive region defining a cavity;

an electrically conductive membrane layer overlying the cavity;

recesses in the membrane layer above the cavity;

a closure layer applied on the membrane layer;

said membrane layer being deformable so that given a change of pressure within a predetermined interval at a side of the membrane layer facing away from the cavity, the membrane layer can deflect so as to cause a change of electrical capacitance defined by the conductive region and the electrically conductive membrane layer;

electrical contacts respectively connected to the membrane layer and conductive region for measuring said change of electrical capacitance; and an opening through said closure layer to said membrane layer for permitting said pressure to be exerted directly on said membrane layer.

3. A pressure sensor according to claim 2 wherein said opening through said closure layer to said membrane layer surrounds a portion of said closure layer which remains above said membrane.

4. A pressure sensor according to claim 2 wherein a stiffening layer is applied on said membrane layer in said opening in said closure layer down to said membrane layer.

5. A pressure sensor according to claim 4 wherein said stiffening layer is formed of a metal layer applied onto said membrane layer and covering at least all of said opening to said membrane layer.

6. A pressure sensor according to claim 2 wherein at least one further layer is provided on said closure layer, said further layer also having an opening aligned with said opening in said closure layer down to said membrane layer.

7. A semiconductor component pressure sensor, comprising:

an electrically conductive region:

a layer over the electrically conductive region defining a cavity an electrically conductive membrane layer overlying the cavity;

recesses in the membrane layer above the cavity;

a closure layer applied on the membrane layer;

said membrane layer being deformable so that given a change of pressure within a predetermined interval at a side of the membrane layer facing away from the cavity, the membrane layer can deflect so as to cause a change of electrical capacitance defined by the conductive region and the electrically conductive membrane layer;

electrical contacts respectively connected to the membrane layer and conductive region for measuring said change of electrical capacitance; and said electrically conductive membrane layer comprising polysilicon.

8. A semiconductor component pressure sensor, comprising:

an electrically conductive region;

a layer over the electrically conductive region defining a cavity;

an electrically conductive membrane layer overlying the cavity;

recesses in the membrane layer above the cavity;

a closure layer applied on the membrane layer;

said membrane layer being deformable so that given a change of pressure within a predetermined interval at a side of the membrane layer facing away from the cavity, the membrane layer can deflect so as to cause a change of electrical capacitance defined by the conductive region and the electrically conductive membrane layer;

electrical contacts respectively connected to the membrane layer and conductive region for measuring said change of electrical capacitance; and said membrane layer comprising metal.

9. A semiconductor component pressure sensor, comprising:

an electrically conductive region;

a layer over the electrically conductive region defining a cavity;

an electrically conductive membrane layer overlying the cavity;

recesses in the membrane layer above the cavity;

a closure layer applied on the membrane layer, a material of the closure layer being introduced into the recesses to close them off;

said membrane being deformable so that given a change of pressure within a predetermined interval at a side of the membrane facing away from the cavity, the membrane can deflect so as to cause a change of electrical capacitance defined by the conductive region and the electrically conductive membrane layer;

electrical contacts respectively connected to the membrane layer and conductive region for measuring said change of electrical capacitance; and an opening through said closure layer down to said membrane layer for permitting said pressure to be exerted on said membrane layer.

* * * * *